(12) United States Patent
Maron et al.

(10) Patent No.: US 8,397,879 B2
(45) Date of Patent: Mar. 19, 2013

(54) PARKING BRAKE AND METHOD FOR OPERATING SAME

(75) Inventors: Christof Maron, Kelkheim (DE); Marcus Schumann, Edingen-Neckarhausen (DE); Faouzi Attallah, Darmstadt (DE); Heinz-Anton Schneider, Niedernhausen (DE)

(73) Assignee: Continental Teves AG & Co. oHG (DE)

( * ) Notice: Subject to any disclaimer, the term of this patent is extended or adjusted under 35 U.S.C. 154(b) by 406 days.

(21) Appl. No.: 12/739,753

(22) PCT Filed: Oct. 23, 2008

(86) PCT No.: PCT/EP2008/064358
§ 371 (c)(1), (2), (4) Date: Apr. 26, 2010

(87) PCT Pub. No.: WO2009/053430
PCT Pub. Date: Apr. 30, 2009

(65) Prior Publication Data
US 2011/0278105 A1 Nov. 17, 2011

(30) Foreign Application Priority Data

Oct. 24, 2007 (DE) .......................... 10 2007 051 078
Oct. 23, 2008 (DE) .......................... 10 2008 052 847

(51) Int. Cl.
*F16D 55/08* (2006.01)
(52) U.S. Cl. ...................................... 188/72.1; 188/158
(58) Field of Classification Search ................ 188/72.1, 188/2 D, 72.6–72.9, 156–158, 159–164; 701/70, 78, 80
See application file for complete search history.

(56) References Cited

U.S. PATENT DOCUMENTS 5,417,624 A 5/1995 Weissbrich et al.
(Continued)

FOREIGN PATENT DOCUMENTS

DE 197 51 445 5/1999
DE 197 32 168 6/2003
(Continued)

OTHER PUBLICATIONS

International Search Report for PCT/EP2008/064358 issued Mar. 18, 2009.

(Continued)

*Primary Examiner* — Pamela Rodriguez
(74) *Attorney, Agent, or Firm* — RatnerPrestia

(57) ABSTRACT

A parking brake having an actuator, wherein the actuator is driven by a direct current motor which can be operated in two directions. The actuator moves, via a self-locking gear mechanism of the actuator, at least one brake shoe for applying or releasing the parking brake in the direction of a rotary element or away therefrom. A control unit for performing open-loop or closed-loop control of the movement of the direct current motor is also provided. The parking brake is designed such that, when the parking brake is applied or released, an application point of the brake shoes against the rotary element is generally overshot. In order to increase the accuracy and reliability of the setting of the brake-application force when the parking brake is applied or of the brake-application clearance when the parking brake is released, the control unit determines the application point by forming the first derivative over time of the electric current taken up by the direct current motor during the application of the brake. A corresponding method for operating such a parking brake is also described.

28 Claims, 6 Drawing Sheets

U.S. PATENT DOCUMENTS

| | | | |
|---|---|---|---|
| 6,321,884 B1 * | 11/2001 | Balz | 188/161 |
| 6,394,235 B1 | 5/2002 | Poertzgen et al. | |
| 7,227,324 B2 * | 6/2007 | Erben et al. | 318/430 |
| 7,734,408 B2 * | 6/2010 | Shiraki | 701/80 |
| 7,992,691 B2 * | 8/2011 | Maron et al. | 188/156 |
| 2006/0261764 A1 | 11/2006 | Erben et al. | |
| 2008/0097675 A1 * | 4/2008 | Konishi et al. | 701/75 |

FOREIGN PATENT DOCUMENTS

| | | |
|---|---|---|
| DE | 102 61 969 | 2/2004 |
| DE | 102 28 115 | 5/2004 |
| DE | 103 61 042 | 5/2005 |
| EP | 0 478 642 | 12/1993 |

OTHER PUBLICATIONS

German Search Report for DE 10 2008 052 847.1 dated Mar. 24, 2009.

* cited by examiner

US 8,397,879 B2

PARKING BRAKE AND METHOD FOR OPERATING SAME

CROSS REFERENCE TO RELATED APPLICATIONS

This application is the U.S. national phase application of PCT International Application No. PCT/EP2008/064358, filed Oct. 23, 2008, which claims priority to German Patent Application No. DE 10 2007 051 078.2, filed Oct. 24, 2007, and German Patent Application No. 10 2008 052 847.1, filed Oct. 23, 2008, the contents of such applications being incorporated herein by reference.

FIELD OF THE INVENTION

The present invention relates to a parking brake having an actuator, wherein the actuator is driven by a direct current motor which can be operated in two directions and which moves, via a self-locking gear mechanism of the actuator, at least one brake shoe for applying or releasing the parking brake in the direction of a rotary element or away therefrom, wherein a control unit is provided for performing open-loop or closed-loop control of the movement of the direct current motor, wherein the parking brake is embodied in such a way that, when the parking brake is applied or released, an application point of the brake shoes against the rotary element is generally overshot, and also to a method for operating a parking brake of this type.

BACKGROUND OF THE INVENTION

An electrically operated parking brake is known, for example, from DE 102 61 969 A1, which is incorporated by reference. The latter has an electric motor which can be actuated by an electronic control unit (ECU). The vehicle brake has a brake piston which acts on at least one friction lining and can be moved out of a position of rest into an activation position in which the brake piston applies the friction lining against a rotary element, which can be connected in a rotationally fixed fashion to the wheel of the motor vehicle, of the vehicle brake. The brake piston can be activated by means of an element, acting on the brake piston, of a gear mechanism unit which is driven by the electric motor. The brake piston can be moved in such a way that the friction linings just bear against the rotary element configured as a brake disc. From the number of motor steps as far as this position, it is possible to determine the wear of the brake linings after comparison with a reference value. If critical wear of the brake linings has been reached, the vehicle driver is warned. In addition, the measured wear of the brake linings is included in the movement travel, into the position of rest, of the element acting on the brake piston.

SUMMARY OF THE INVENTION

An electric parking brake in the form of a disc brake or drum brake has the fundamental task of reliably arresting a motor vehicle by means of electrically driven friction brakes in accordance with the legal and/or customer-specific requirements. The driver of a motor vehicle with such an electric parking brake must be able to count on the functional reliability of this brake-by-wire brake system in this context.

A central customer requirement prescribes that at least a predefined brake-application force (for example 18.5 kN) is to be set whenever the brake is applied, regardless of the environmental influences or other peripheral conditions. This requirement already takes into account all the vehicle-specific and manufacturer-specific actuators, in particular the maximum expected positive pitch, the diameter of the brake discs, the coefficients of friction of the linings etc. It is also necessary to ensure that when the electric parking brake is released, a sufficiently large brake-application clearance is set so that the brake does not overheat during the further operation of the motor vehicle.

A basic problem of contemporary open-loop/closed-loop control systems of parking brakes is that the brake-application force is not measured directly, as described in document DE 102 28 115 B4, which is incorporated by reference, but instead is determined indirectly from other parameters, for reasons of cost.

In order to bring about accurate and reliable setting of the necessary brake-application force and brake-application clearance, it is necessary to know precisely the position of the piston and/or brake shoes. As is explained more precisely below, the position-determining process is frequently carried out by means of a motor model which has constants which are not precisely known, and which includes approximations, with the result that during the position-determining process which integrates these errors, errors are produced which can have an adverse effect on the accuracy and reliability of the setting of the parking brake.

A fixed point during the movement of the actuator is what is referred to as the application point, i.e. the point at which the brake linings just bear against the brake disc. This point is generally overshot during the application and release of the parking brake. This point can therefore be utilized for the position-determining process, since both the necessary brake-application clearance and the desired brake-application force can be set in a way which is defined on the basis of this point. The methods according to the prior art which are described above are not suitable for precisely determining the application point or cannot be used in the system of the parking brake when force measurement fails to occur.

An object of the invention is therefore to provide a parking brake and to specify a method for operating such a parking brake, both of which permit more accurate setting of the desired brake-application force during the application of the parking brake and more accurate setting of the brake-application clearance during the release of the parking brake.

An object of the invention is achieved by means of a method in which in order to determine the application point, the control unit forms the first derivative over time of the electric current taken up by the direct current motor during the application of the brake.

The method according to aspects of the invention relates to the fact that at the application point the derivative of the brake-application force with respect to the brake-application travel becomes greater than zero. In addition, it is taken into account that the derivative of the force over time is linked, via the rotational speed of the engine, to the derivative with respect to the travel. In addition, the realization that the force is approximately proportional to the current taken up by the direct current motor is also utilized. As a result of this, the consideration of the derivative according to aspects of the invention provides information about the application point.

In particular, on the basis of the above assumptions and simplifications it is possible to conclude that the application point can be determined as the positioning point of the brake shoe at which the derivative over time of the electric current which is taken up by the direct current motor becomes greater than zero. This value of the first derivative is preferably not identified as the application point until the derivative of the current before then has been negative. This condition permits the current profile under consideration in the vicinity of the application point to be delimited from the current profile when the direct current motor starts to move.

Reliable and robust detection of the application point by the control unit can be carried out by means of a an exemplary method which can be applied even in the case of unusual current profiles, and which has the following steps:

definition of a positive derivative threshold value for the first derivative, checking of the brake-application movement of the direct current motor at predefined, preferably regular, intervals in order to determine whether the first derivative of the current taken up by the direct current motor is greater than or equal to the derivative threshold value, if the first derivative is greater than or equal to the derivative threshold value, noting of the current brake shoe position as a potential application point and starting of a counter as well as incrementing of the counter by a previously defined incrementation value during the further brake-application movement of the direct current motor as long as the first derivative is greater than or equal to the derivative threshold value, or resetting of the counter to zero as soon as the first derivative drops below the derivative threshold value again during the further brake-application movement of the direct current motor, checking whether the counter exceeds a predefined counter threshold value, and if the counter exceeds the predefined counter threshold value, definition of the respective, noted potential application point as the actual application point for the respective application of the parking brake.

In one exemplary embodiment, in order to perform open-loop or closed-loop control of the movement of the direct current motor in order to apply the parking brake with a desired, predefined brake-application force, the control unit determines a maximum current value which is taken up by the direct current motor, the application of the brake is carried out by a corresponding movement of the direct current motor, and the movement of the direct current motor which leads to the application of the parking brake is ended after the maximum current value has been reached.

It is also advantageous if during open-loop or closed-loop control of the movement of the direct current motor for applying and/or releasing the parking brake, the control unit takes into account a hydraulic admission pressure which is currently present at the piston if the brake is applied or was present at the piston if the brake has been released when it had previously been applied.

This method according to aspects of the invention is advantageous because the brake-application force which is set is superimposed additively on the hydraulic admission pressure which prevails in the system, with the result that the sum of the forces of the hydraulic admission pressure and the brake-application force which is set yields a resulting brake-application force which leads to a higher level of wear of the mechanical components than the brake-application force which is set. In terms of the release, the hydraulic admission pressure should be noted in particular when the application point is detected. Accordingly, the accuracy of the setting of the brake-application force or of the brake-application clearance can be increased further by virtue of the fact that, according to aspects of the invention, the hydraulic admission pressure which is present in the system is taken into account during the application or release of the parking brake.

In exemplary embodiments, when the brake has been applied and/or released by means of a motor model, the control unit continuously determines an activation travel which has been carried out by the direct current motor. The activation travel of the direct current motor also corresponds to the travel which the nut carries out on the spindle which is driven by the motor, or of the pistons. Owing to this advantageous procedure, it is very easy, as described below, to take into account the hydraulic admission pressure during, for example, the calibration of the piston position to the application point.

In one exemplary embodiment, the control unit firstly determines the application point which has been overshot during the application of the brake or the position when the maximum current value is reached, and calibrates a piston position, determined by means of a motor model, while taking into account the hydraulic admission pressure acting at the determined application point or the determined position when the predefined maximum current value is reached. In this context, the calibration to the application point is preferred, and when the application point could not be determined, calibration is carried out to the position when the maximum current is reached, for example.

As has already been stated above, the hydraulic admission pressure which is present when the brake-application force is implemented must also be taken into account, the brake-application force which is set being superimposed on said hydraulic admission pressure. By means of the hydraulic admission pressure it is possible, as shown below, to calibrate the piston position which is determined only using a motor model (see example below) to the application point or to the point at the end of the brake-application process. This is a particularly simple way of calibrating positions and it corresponds to accurate open-loop or closed-loop control of the actuator movement during the application or release of the brake.

In another exemplary embodiment, the control unit determines a brake-application travel which has been carried out from the activation travel between the determined application point and the activation position when the predefined maximum current value is reached, and the brake-application travel which has been carried out is subsequently compared with a standard brake-application travel corresponding to the desired brake-application force, wherein, when there is a significant deviation of the brake-application travel which has been carried out from the standard brake-application travel, specifically when the brake-application travel which is carried out is significantly smaller than the standard brake-application travel, a retightening function of the control unit is activated. For example, when the brake-application travel which is carried out deviates from the standard brake-application travel by more than 50%, i.e. if the brake-application travel which is carried out is significantly smaller than 50% of the standard brake-application travel, a brake retighten process is triggered.

This exemplary embodiment assumes that no information about the brake-application force which is actually brought about is available even after the switch-off/maximum current value has been reached and the brake-application process has ended. On condition that the application point, i.e. the point at which the brake linings just bear against the brake disc, is known, the comparison of the travel which is carried out by the application point up to the point when the maximum current value is reached (brake-application travel which is carried out) and the standard brake-application travel which is determined on the basis of a standard caliper characteristic curve, it is possible to check whether the necessary brake-application force has, in all probability, actually been set. The standard brake-application travel results here from the standard caliper characteristic curve of the parking brake for the desired brake-application force. The standard caliper characteristic curve here is the relationship between the brake-application force and the deformation of the parking brake elements (or piston travel) which occurs on the basis of the rigidity of the elements.

In one exemplary embodiment, the retightening function includes a travel adjustment, wherein the retightening of the brake is preferably carried out directly after the brake-application process has ended. This procedure is advantageous since it is known from trials that to re-start the actuator a significantly higher current is required than the current which was used when the brake was last applied. For this reason, a brake-retightening concept is implemented which does not require the switch-off or maximum current value which is defined in the brake-application process described above.

In a further exemplary embodiment, the control device uses a knock function for retightening of the brake, wherein the retightening of the brake is preferably carried out directly after the brake-application process has ended in this exemplary embodiment too. The knock function is an advantageous measure during the application of the brake, during which measure a number of torque pulses are preferably transmitted to the actuator as a function of the actuator temperature, the available voltage and the switch-off current which is reached at the end of a brake-application process, with the result that a relatively high brake-application force is set. An example of such a knock function is explained below.

In a further advantageous exemplary embodiment of the method according to aspects of the invention, in order to release the parking brake, the control unit controls the movement of the nut in the release direction, wherein the application point which was determined during the last application of the brake, while taking into account the hydraulic admission pressure, and a predefined brake-application clearance are taken into account in the calculation of the setpoint movement travel used for the control of the movement of the nut. The determination of the setpoint movement travel is therefore simplified and is also comparatively accurate by virtue of the use of the application point which is determined, since integration of errors is avoided in this way.

An object of the present invention is also achieved by means of a parking brake in which the control unit determines the application point by forming the first derivative over time of the electric current which is taken up by the direct current motor during the application of the brake. The parking brake according to aspects of the invention has the advantages mentioned above with respect to the method according to aspects of the invention. The exemplary embodiments of the parking brake according to aspects of the invention correspond to the exemplary embodiments explained above with respect to the method according to aspects of the invention.

Further features, advantages and application possibilities of the present invention also emerge from the following description of exemplary embodiments of a parking brake according to aspects of the invention or of a method according to aspects of the invention for operating such a parking brake on the basis of figures. Here, all the features described and/or illustrated figuratively form, in themselves or in any desired combination, the subject matter of the present invention, even independently of their combination in the claims or their back-references.

DETAILED DESCRIPTION OF THE INVENTION

1. Description of the Parking Brake According to an Aspect of the Invention

Figure 1:
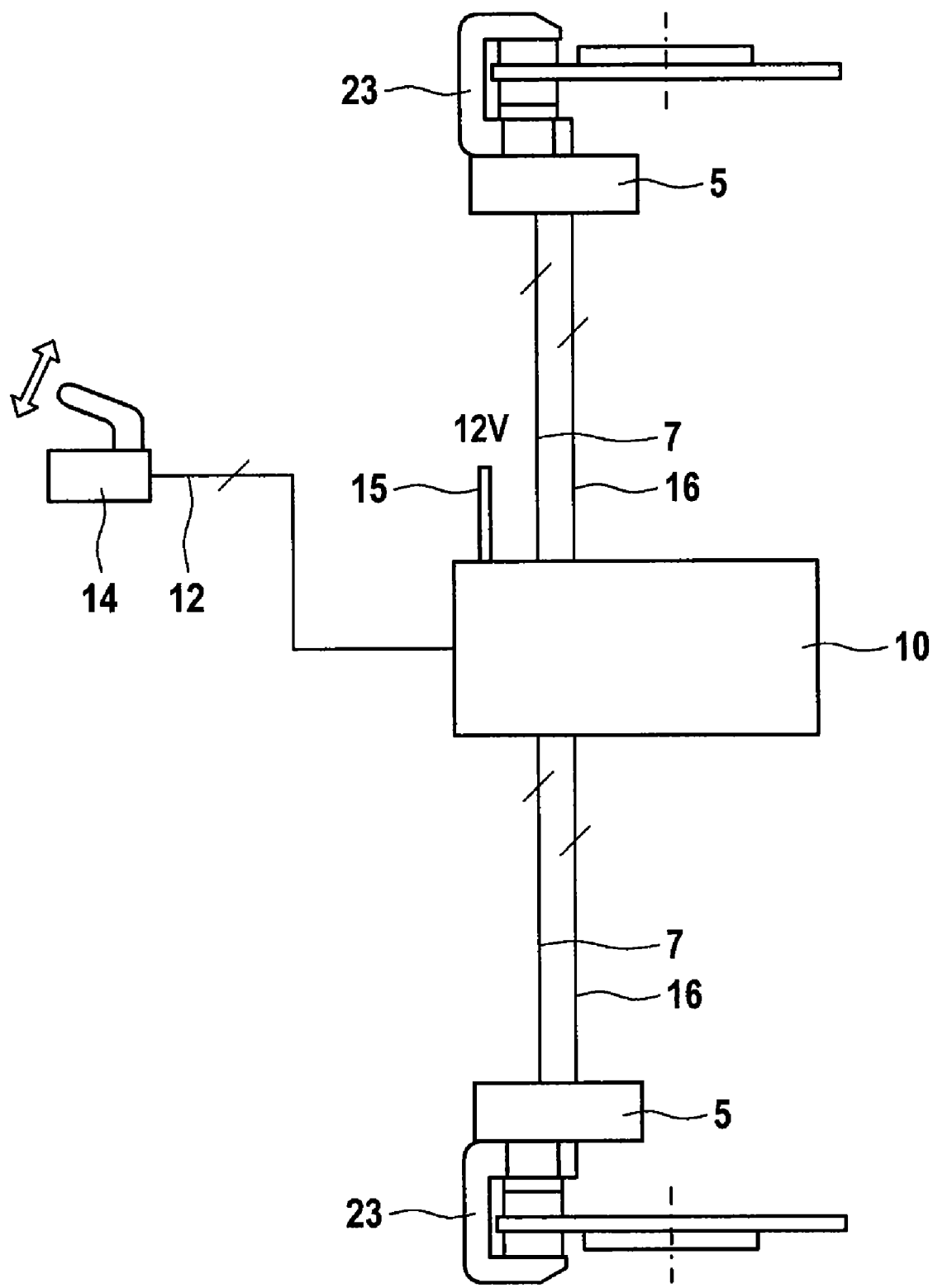
FIG. 1 shows a first set of the components of an inventive parking brake in the form of a circuit diagram.

The parking brake according to aspects of the invention which is illustrated in FIG. 1 for a motor vehicle has, for each wheel, an actuator 5 which is respectively connected to a control unit 10 via an open-loop/closed-loop control line 7. FIG. 1 also shows the connection of the control unit 10 via an (if appropriate multiple) open-loop/closed-loop control line 12 to the activation switch 14 of the parking brake with which the application or release of the parking brake can be initiated by the driver of the motor vehicle. The control unit 10 has a voltage supply 15 and is also connected in each case to the actuators 5 by a line 16 which transmits the temperature of the respective actuator 5 to the control unit 10.

Figure 2:
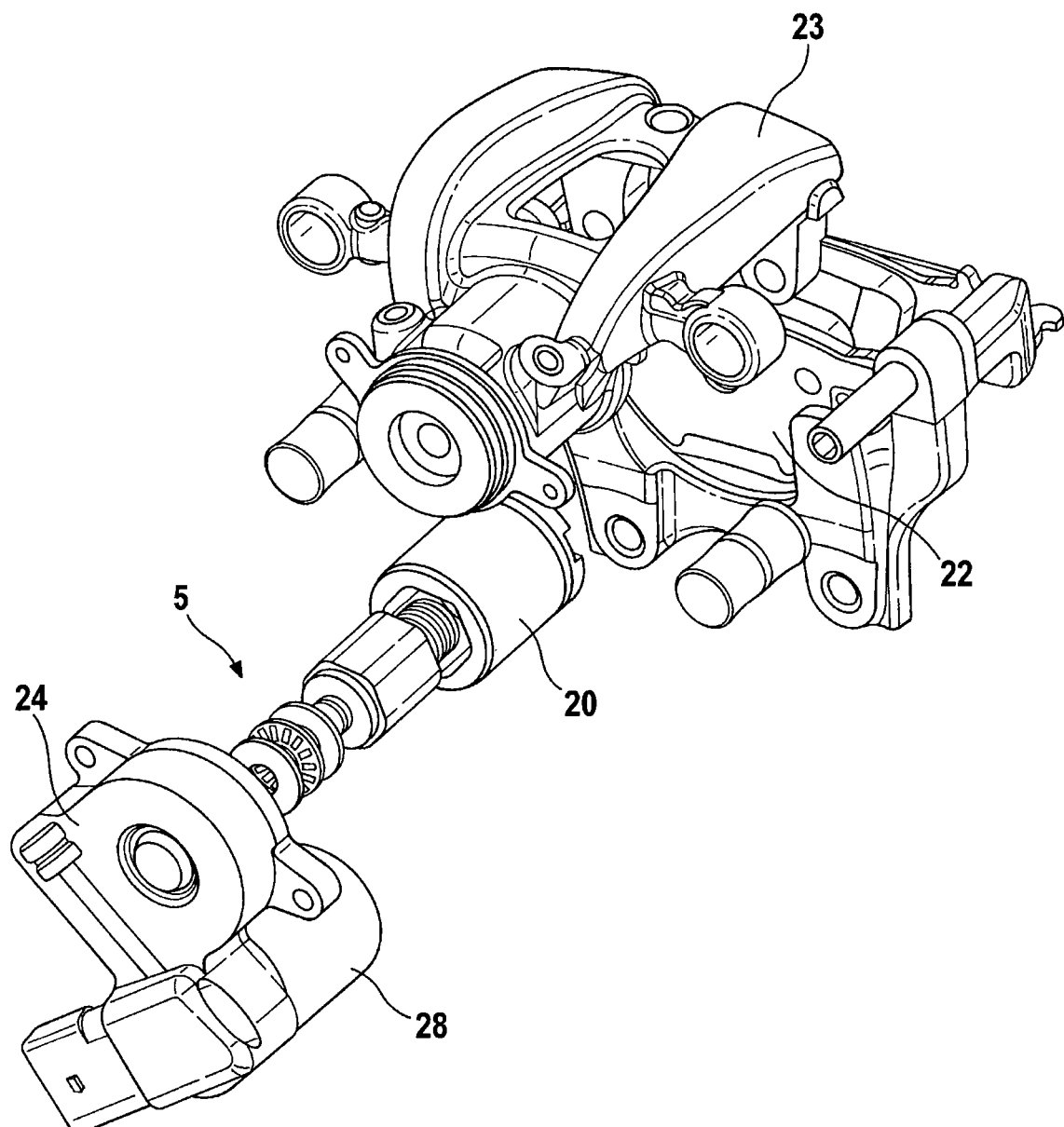
FIG. 2 shows a second set of the components of the inventive parking brake according to FIG. 1 in a perspective view from the side.
Figure 3:
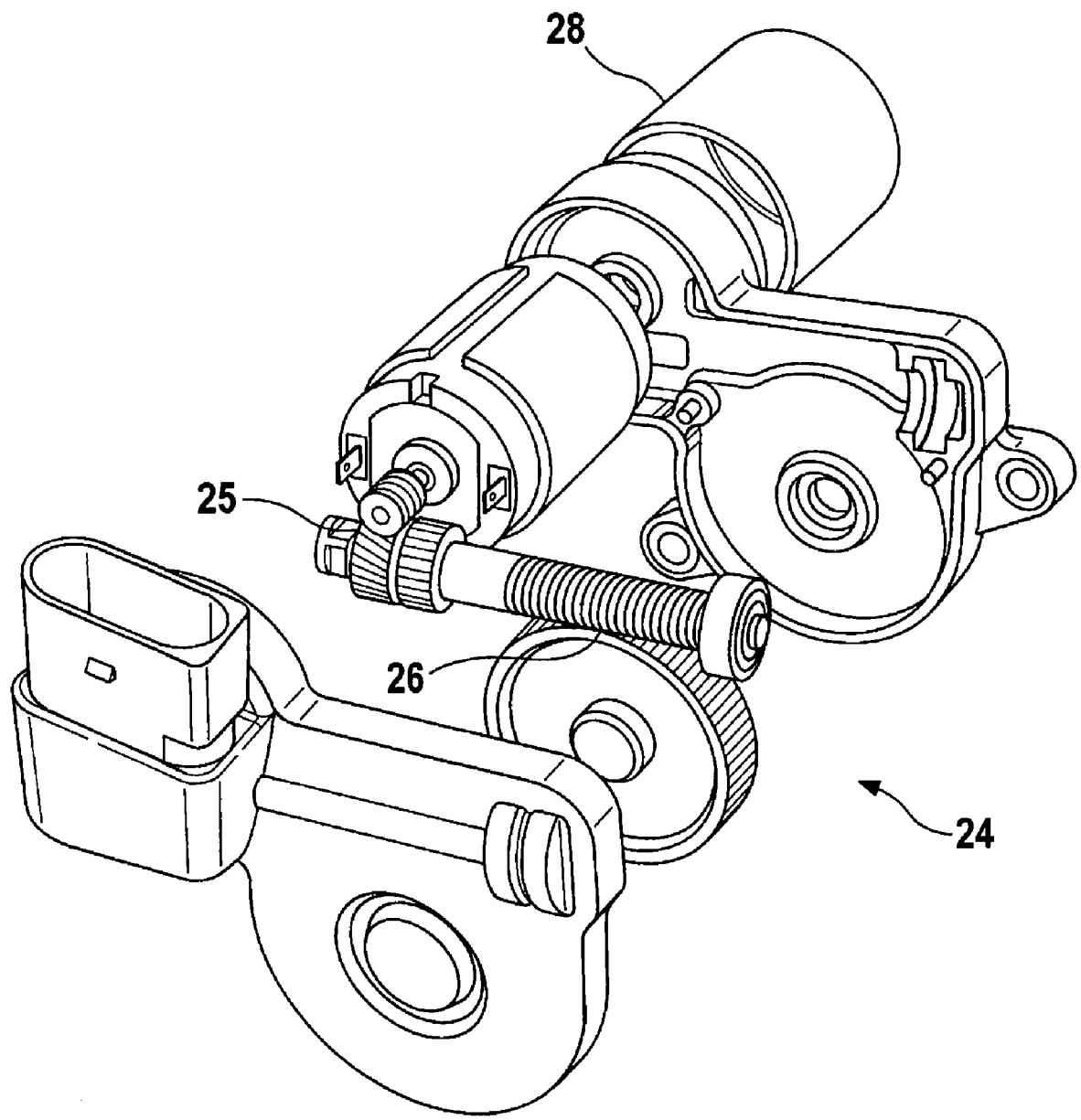
FIG. 3 shows the motor and the gear mechanism stages of the inventive parking brake according to FIG. 1 in a perspective view from the side (partially exploded illustration)

FIGS. 2 and 3 show that each actuator 5 is provided with a spindle which is located in the hydraulically operated brake piston 20 and on which the rotationally secured nut moves with the rotational movement of the spindle in the axial direction, and applies a tensioning force to the brake linings 22 and the brake disc (not illustrated) when there is contact with the brake piston during the application of the brake. The rigidity of the system is generated, inter alia, by the brake caliper 23.

The spindle is driven by a double-stage worm gear 24 with a first gear stage 25 and a second gear stage 26 by a direct current motor 28 which has brushes and can be operated in two directions.

The clamping force which is generated is supported by the axial bearing. The second stage 26 of the worm gear implements the self-locking which is necessary for the parking brake function. The self-locking includes the fact that once a clamping force has been applied by the direct current motor 28, it is maintained even without current.

In order to set the necessary brake-application force, the motor current is measured and the voltage applied to the motor is defined in the necessary direction by means of the control unit 10 which is connected to an H bridge (not illustrated). The brake-application force itself is not measured, for reasons of cost. The same also applies to the position of the motor and the rotational speed of the motor 28.

It is optionally possible to use a converted rotational speed sensor to measure the rotational movement of the motor. This is done by generating rotational speed pulses which are sensed by the sensor. However, there is no provision for the sense of direction to be detected, but instead the means for sensing the movement of the motor have to determine the sense of rotation themselves on the basis of the actuation of the motor. Since it is not possible to take into account all cases in this way, for example if the motor is moving in a negative direction, even though a positive voltage is present and a positive current is flowing, it is not possible to sense the position without errors in this exemplary embodiment either.

In the exemplary embodiments of the method according to aspects of the invention which are explained below, the following symbols are used for the elements and physical variables of the parking brake which are specified below:

| Motor 28 | |
|---|---|
| Motor constant: | $k_t$ |
| Resistance of motor winding (incl. feed line): | $R_{mot}$ |
| Inductance of motor (incl. feed line): | $L_{mot}$ |
| Temperature-dependence of motor constant: | $C_{kt}$ |
| Moments of mass inertia (estimated): | $\theta$ |
| Nominal current: | $i_{nom}$ |
| Nominal voltage: | $u_{nom}$ |
| Nominal rotational speed: | $n_{nom}$ |
| Nominal torque: | $M_{nom}$ |
| Gear mechanism 24 | |
| Transmission ratio of first stage 25: | $ü_1$ |
| Transmission ratio of second stage 26: | $ü_2$ |
| Positive pitch/efficiency: | p |
| Actuator 5 | |
| Overall transmission ratio | ü |
| Overall efficiency | η |
| Constant frictional torque | $M_{R0}$ |
| Rigidity of caliper | c |
| Piston | |
| Effective diameter: | d |
| Effective area: | $A_{eff}$ |

The core element of the means for actuating the actuator of the control unit 10 is a travel controller which carries out the following functions:

adjustment of the position within the scope of the possibilities, switching off when the predefined current limit is reached (maximum current value), and switching off when a stationary state is reached.

In an exemplary embodiment of the invention, the travel controller prescribes the following variables for the actuation of the H bridge which is connected to the direct current motor 28:

pulse width modulation (−1=release direction, 0=braking mode, +1=brake-application direction)

H bridge enable.

In one exemplary embodiment, the travel controller of the control unit 10 is configured in such a way that it can only switch the voltage on and off, and it is not possible to set intermediate values of the voltage. What is referred to as a three-point controller is therefore present. The desired position of the piston or of the brake shoes is therefore set by switching into the braking mode when the desired position is traveled over. The resulting control difference can then be subject to tolerances. This form of genuine three-point control is used during the release and during the retightening of the parking brake.

Furthermore, the controller must also be switched off when the manipulated variable limit is reached (i.e. when the maximum current value or minimum current value is reached). To do this, the current is monitored for upward transgression of the previously determined current limits. However, it is to be ensured that the high starting up current of the direct current motor 28 is ignored with respect to the switch-off condition, since it is basically above the predefined maximum limits. For this purpose, the monitoring of the reaching of the current limits is not carried out until after a predefined time (for example 50 to 150 ms) after the switching on of the travel controller has started. The switching off when the predefined maximum current value has been reached is achieved during the application of the brake by virtue of the fact that a setpoint value which cannot be achieved by the actuator 5 is predefined as the position setpoint value.

The travel controller of the control unit 10 must also be switched off when a stationary state (movement standstill) is reached. Here, the control objective or the limitation of the manipulated variable is not achieved. This situation occurs, for example, during the application of the brake whenever the available voltage is not sufficient to reach the predefined maximum current value. In particular, the detection of the stationary state is critical here since the presence of a movement is only estimated and not monitored. It is therefore possible for situations to occur in which a stationary state of the actuator 5 is not detected. In order to avoid such a case, it is possible, for example, to use the power loss as the switch-off criterion. Since said power loss is not measured directly, it is possible to determine it, for example, from the square of the current which is applied for the respective process. Alternatively, it is possible to monitor the simple current integral (integral of the absolute value of the current) which provides the advantage that even long processes which operate with low currents can be detected and switched off.

2. Description of the Motor Model

For the following considerations it is assumed that the movement of the direct current motor can be described by means of the known "direct current machine" model. This involves the particular feature that the motor model which is to be implemented by means of the software operates with sampled values and is discrete with respect to time. In the case of sample times of $T_0$=10 ms used in the exemplary embodiment, the current is no longer sampled quickly enough to sense the influence of the inductance of the motor on the behaviour. For this reason, the inductance is ignored in the motor model which is discrete with respect to time. The motor model is accordingly simplified to the following representation:

$$u(k \cdot T_0) = R_{mot} \cdot i(k \cdot T_0) + \omega(k \cdot T_0) \cdot k_t \quad \text{(Equation 1)},$$

where u ... denotes the voltage, ω ... denotes the rotational speed of the direct current motor and $k \cdot T_0$ denotes the current sampled value.

From this equation it is possible, by simple conversion, to determine both the current rotational speed of the motor and also continuously the position of the motor (activation position) and/or the activation travel by integrating the rotational speed:

$$\omega(k \cdot T_0) = \frac{u(k \cdot T_0) - R_{mot} \cdot i(k \cdot T_0)}{k_t} \quad \text{(Equations 1a and 1b)}$$

$$\varphi(k \cdot T_0) = \varphi((k-1) \cdot T_0) + \omega(k \cdot T_0) \cdot T_0$$

3. Method of Functioning of the Parking Brake According to an Aspect of the Invention When the parking brake according to aspects of the invention is applied, the motor is driven in the direction of application of the brake, that is to say for example with a positive voltage applied, via the H bridge. After the motor has started, the current quickly drops to a minimum value, the so-called idling current, while the maximum rotational speed is set. After the linings have come to bear against the brake disc, i.e. after the brake-application clearance has been overcome, a force builds up and the current increases. The actuator is then driven by the direct current motor until a maximum current value is set or exceeded. The brake-application force assigned to the corresponding current is then reached.

When the parking brake is released, the direct current motor is operated in the opposite direction, for example by application of a negative voltage. As explained below, when the parking brake is released the control unit carries out a control process in order to set the release travel.

4. Application of the Parking Brake According to an Aspect of the Invention

For the described procedure it is necessary, when the brake is applied, to determine the maximum current value in advance for the desired brake-application force. This current value depends, inter alia, on the temperature and the available voltage. The temperature influences the resistance of the motor, the motor constant and the properties of lubrication and therefore the efficiency. The resistance of the motor increases as the temperature increases, whereas the motor constant decreases. The properties of the lubrication (grease) become worse as the temperature decreases since thickening occurs. In contrast, at very high temperatures the grease becomes too fluid with the result that its properties also become worse. On the other hand, the properties of the grease are substantially constant over the temperature range which is relevant for the parking brake.

Figure 4:
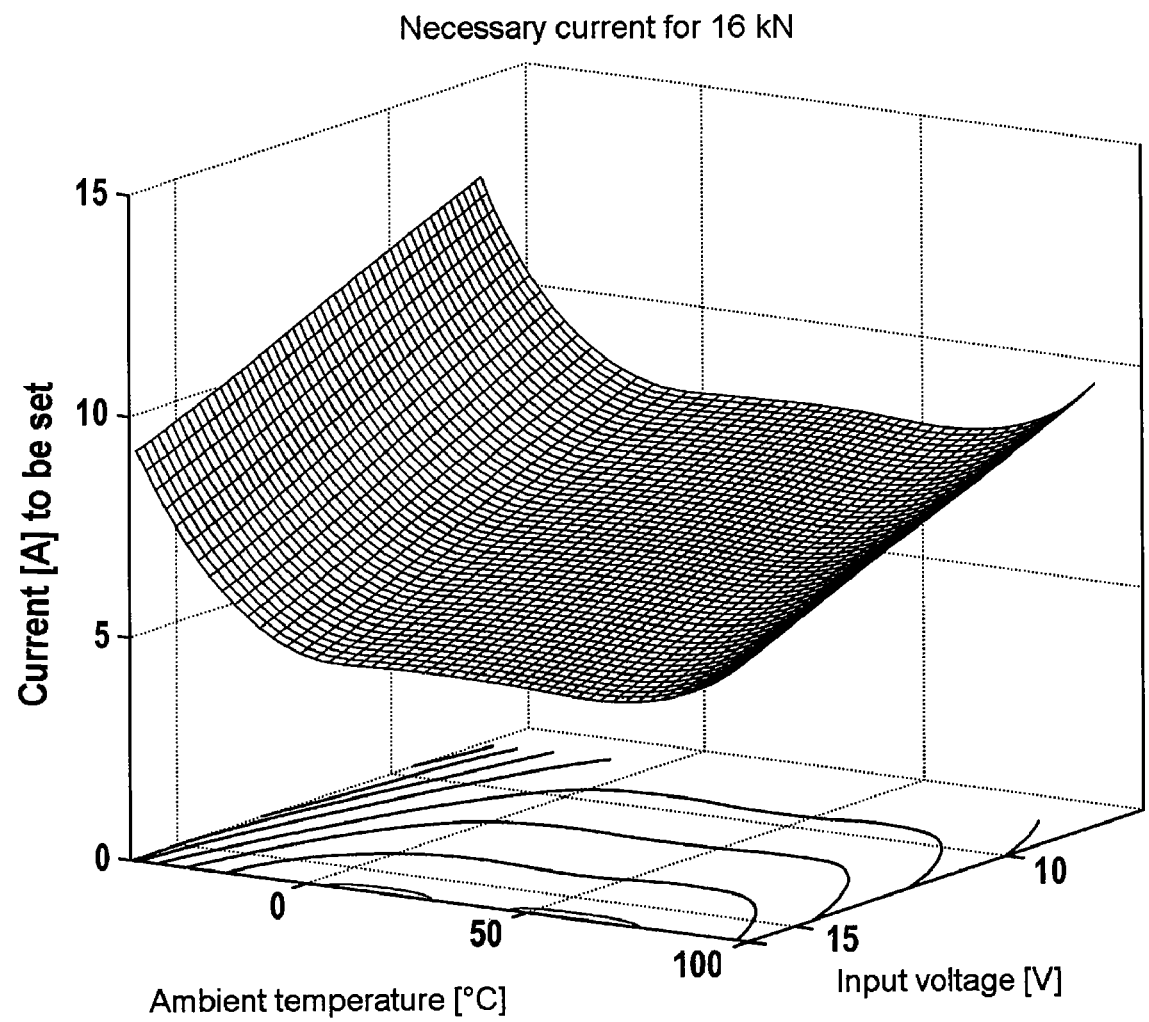
FIG. 4 shows a characteristic diagram of the maximum current value to be implemented during the application of the brake (current to be set in A), in order to obtain a brake-application force of 16 kN, as a function of the ambient temperature (in °C.) and the input voltage of the direct current motor (in V) without taking into account the hydraulic admission pressure.

A maximum current value is most easily determined by measuring the actuator properties experimentally and storing the corresponding maximum current values in a characteristic diagram. Such a characteristic diagram is illustrated in FIG. 4. It shows the necessary maximum current value for a brake-application force of 16 kN as a function of the ambient temperature and the input voltage of the motor. However, the characteristic diagram which is obtained by measuring was registered without taking into account the hydraulic admission pressure.

In a first exemplary embodiment of the invention, a characteristic diagram which is shown in FIG. 4 is respectively determined for specific hydraulic admission pressures which are present at the piston of the actuator, and the characteristic diagrams which are generated in this way for determining the maximum current value as a function of the hydraulic admission pressure and the ambient temperature and input voltage are made available in the control unit of the parking brake according to aspects of the invention. For hydraulic admission pressures which are between the values for which characteristic diagrams exist, the corresponding value can be interpolated for the maximum current.

In order to avoid having to register characteristic diagrams anew taking into account the hydraulic admission pressure for each new design state of the actuator—which is time-consuming—a method is illustrated below with which the switch-off/maximum current value can be determined algorithmically.

The desired brake-application force $F_{epb}$ is essentially obtained from the following relationship between the brake-application force which has been reached and the current which is set at the end of the movement, as a function of the maximum current value $i_{max}$ assuming constant efficiency levels:

$$F_{epb} = \frac{(i_{max} \cdot k_t - M_{R0}) \cdot \eta \cdot ü \cdot 2 \cdot \pi}{p}. \quad \text{(Equation 2)}$$

The desired brake-application force which is set therefore depends on geometric data (spindle pitch and transmission ratio ü) of the actuator, on the motor constant $k_t$, on the overall efficiency $\eta$ and on the constant friction $M_{R0}$ to be taken into account. The relationship between the maximum force which is set and the maximum current value is therefore linear.

While the geometric data of the actuator are known and can be assumed to be constant, the motor constant is temperature-dependent. The efficiency of the actuator and the constant friction change not only as a function of the temperature (lubricant) but also as a function of the wear, i.e. they are, for example, dependent on the number of activations of the parking brake.

If a hydraulic admission pressure $p_{hyd}$ is present at the piston with the effective area $A_{eff}$ in the system, the brake-application force which is set according to (Equation 2) is superimposed thereon. This can be illustrated as follows:

$$F_{epb} = \frac{(i_{max} \cdot k_t - M_R) \cdot \eta \cdot ü \cdot 2 \cdot \pi}{p} + p_{hyd} \cdot A_{eff}. \quad \text{(Equation 3)}$$

Transposition of (Equation 3) according to $i_{max}$ results in the relationship according to aspects of the invention which takes into account the hydraulic admission pressure:

$$i_{max} = \frac{(F_{epb} - p_V \cdot A_{eff}) \cdot p_{Sp}}{\eta \cdot ü \cdot \pi \cdot k_t} + \frac{M_R}{k_t} \quad \text{(Equation 4)}$$
$$= (F_{epb} - p_V \cdot A_{eff}) \cdot m(\eta) + b(\eta).$$

The maximum current value in (Equation 4) is composed of two components. The first component generates the actual force under the peripheral condition that the constant friction is zero. The second component takes into account the proportion of the current which is consumed in actually causing the motor to rotate. Both components depend not only on the wear but also on the temperature via the motor constant.

When calculating the maximum current value, it is necessary to take into account the fact that the first component must never be smaller than zero. This means that the following must always apply:

$$F_{epb} \geq p_V \cdot A_{eff} \quad \text{(Equation 5)}$$

Force requirements which are less than the instantaneously prevailing hydraulic admission pressure (pedal pressure) must therefore be correspondingly raised and made available in corresponding characteristic diagrams for the calculation of $i_{max}$.

The parameters $m(\eta)$ and $b(\eta)$ from (Equation 4) which are initially unknown can be determined in advance in an exemplary embodiment of the invention by means of appropriate tests.

In a further exemplary embodiment, $b(\eta)$ can be replaced by the idling current $i_{idle}$, determined during a brake-application process, as a good estimated value, since $b(\eta)$ represents the portion of the current which is consumed in moving the motor itself. This results in:

$$i_{max} = (F_{epb} p_V \cdot A_{eff}) \cdot m(\eta) + i_{idle} \quad \text{(Equation 6)}$$

In a further exemplary embodiment, the parameter $m(\eta)$ of the force-generating component can be expressed as a function of $i_{idle}$, $(m(\eta)=m(i_{idle}))$.

In order to take into account the temperature-dependence of the maximum current value, a correction component $i_{corr}$ (T) is taken into account which has, for example, the values (in A) which are specified in the table below, for the specified temperature ranges T1 to T4 (actuator temperature):

|  | T1 | T2 | T3 | T4 |
|---|---|---|---|---|
| $i_{corr}$ (A) | 4 | 2 | 0 | 2 |

The characteristic diagram here is divided into the following fields:

T1: −40° C.<T<−20° C.
T2: −20° C.<T<0° C.
T3: 0° C.<T<80° C.
T4: 80° C.<T<100° C.

Alternatively, it is also possible to carry out a correction which, in addition to the temperature-dependence, takes into account the voltage (voltage ranges U1 to U4) which is present at the direct current motor:

| $i_{corr}$ (A) | T1 | T2 | T3 | T4 |
|---|---|---|---|---|
| U1 | 6 | 3 | 2 | 4 |
| U2 | 5 | 2 | 1 | 3 |
| U3 | 4.5 | 1 | 0 | 2 |
| U4 | 3.5 | 0 | −1 | 1 |

The characteristic diagram here is divided into the following fields:

T1: −40° C.<T<−20° C. U1: 8 V<u<10 V
T2: −20° C.<T<0° C. U2: 10 V<u<12 V
T3: 0° C.<T<80° C. U3: 12 V<u<14 V
T4: 80° C.<T<100° C. U4: 14 V<u<16 V

From the model above it follows that the correction value zero applies to the nominal case, specifically u=13 V and room temperature. Both tables can also contain significantly more reference points. Linear interpolation is carried out between the specified reference points.

The temperature of the actuator must be known for the determination of the correct correction value. If, for reasons of cost, it is not possible to carry out a measurement of the temperature directly at the actuator, it is possible to use the ambient temperature, in particular for the ranges T1 to T3, instead of the temperature of the actuator. If the actuator temperature is higher than the measured ambient temperatures, this affects the brake-application force which has been set only to the extent that the latter becomes too large. However, this can be tolerated in terms of vehicle safety.

The range T4 cannot be determined by measuring the ambient temperature. The temperatures from the range T4 occur, however, only if the actuator itself heats up very strongly (crazy driver) or is heated up from the outside as a result of a hot brake system. However, these cases can be covered by temperature models. The range T4 is accordingly implemented by a combination of an ambient temperature measurement and two temperature models (self-heating of the actuator and heating by the brake system).

The above considerations regarding the temperature correction and, if appropriate, voltage correction result in the following equation for the determination of the switch-off current:

$$i_{max}=(F_{epb}-p_v \cdot A_{eff}) \cdot m(\eta)+i_{idle}+i_{corr}(T, \text{if appropriate } u) \quad \text{(Equation 7)}.$$

In a further exemplary embodiment, the wear can be made dependent by virtue of a dependence of the parameters $m(\eta)$ and/or $i_{corr}$ on the number of activations n of the actuator which have taken place until then. This means $$m(\eta)=g(n); i_{corr}=f(T, \text{if appropriate } u,n) \quad \text{(Equation 9)}.$$

Since the force which is actually applied is not explicitly known at the end or after the completion of the brake-application process, it is possible, in one exemplary embodiment, to determine the brake-application travel $x_{clamp}$ which is carried out during the application of the brake, i.e. the activation travel on the basis of the application point, in order to check whether the brake-application force which is achieved is sufficient and corresponds to the predefined value. If the caliper characteristic curve of the parking brake just corresponds to the "standard caliper characteristic curve", a standard brake-application travel can be determined from the latter on the basis of the desired brake-application force. When the brake-application travel which is actually carried out is compared with the standard brake-application travel, it is possible to estimate whether the brake-application force which is achieved also corresponds to the desired brake-application force. If the brake-application travel which is set is significantly smaller than the standard travel difference, in one particularly exemplary embodiment the control unit activates a retightening function.

The retightening is preferably carried out directly subsequent to the brake-application process without explicitly switching off the H bridge, since it is known from tests that a significantly higher current is required to restart the actuator than during the last application of the brake. The direct connection of the retightening function to the brake-application process has the advantage that a very high switch-on current does not occur once more.

An embodiment possibility for retightening is to carry out further application of the parking brake by means of a travel controller. Here, the position which is present at the end of the brake-application process is used as the basis. The travel controller uses, taking this as the basis, a position setpoint value which has a value which is greater by dx than the position at the end of the brake-application process. In the case of the position which is greater by dx it is assumed that the brake shoes are applied with a correspondingly greater force. During the retightening, the travel controller attempts to set the value which is greater by dx in the brake-application direction. Here, the limit which is used for the actual brake-application process (maximum current value) is not used, but rather a further ("softened") current-limiting value is predefined, and said value is monitored. The further current-limiting value is characteristic of the state in which the actuator is at the end of its physical possibilities, i.e. the actuator does not exceed an absolute maximum current value. The retightening is stopped by the control unit either when the travel which is greater by dx is reached or, if this travel is not reached, when the further current-limiting value is reached.

A further possible way of implementing a retightening function is the so-called knock function. This special variant of the retightening process can be carried out as a function of the actuator temperature, the available voltage and the switch-off current which is achieved at the end of the brake-application process. In this context, a number of torque pulses are transmitted to the actuator so that a relatively high brake-application force occurs. In order to generate the torque pulses, the H bridge is switched on for a defined time. The device then waits for a predefined time (for example 150 ms). If the maximum predefined current (further current-limiting value or maximum current value) is exceeded during this switch-on phase after expiry of a minimum time (for example 50 ms), this torque pulse is aborted, and the device waits again for the specific, predefined time. For example, the following number of torque pulses (also referred to as knocks) can be applied:

$$n_{Knocks} = trunc\left(\frac{|T|}{10°\ C.} + 1\right).\qquad\text{(Equation 10)}$$

The pulses $n_{Knocks}$ are each 150 ms long and follow one another every 300 ms.

The knock function can also be analogously carried out during the "normal" brake-application process, in particular at the end thereof. Its application is therefore not restricted to the tightening process.

For the determination of the maximum current value, the latest idling current is taken into account, as represented above. The idling current is measured when the brake-application clearance is traveled over. The absolute-value minimum of the current during the application of the brake can be used as an idling current value as a means of implementing the measurement of the idling current. As a result, the start-up current does not have to be separately taken into account and an event is determined even if no brake-application clearance is present. The minimum of the current can in this case also be used as an equivalent value, and in this context the value which is found in this way for the idling current has to be limited to a maximum value.

In order to determine the temperature which is used for the calculation of the maximum current value, it is necessary to select or calculate from the measured actuator temperatures that temperature which is ultimately used to calculate the maximum current value. In particular, when parking brakes are used on both sides of the motor vehicle, there are two actuators at which temperature measurements are carried out. If the measurements are not perceptibly incorrect at both actuators, that temperature of the two which will generate a higher switch-off current is advantageously selected for the calculation of the switch-off current. If one of the two temperature measurements is perceptibly incorrect, the measured value of the error-free measurement is used to determine the maximum current value. If both measurements of the temperature are perceptibly incorrect, a "worst-case" temperature, for example −40° C., can be used for the calculation of the maximum current value.

Alternatively to using a current limitation in order to set the desired brake-application force, it is possible to set the desired brake-application force by means of a previously determined brake-application travel. In this context, the relationship between the brake-application force and the piston travel which was discussed in relation to the release of the parking brake, or the deformation of the brake caliper and of the linings, is used. This relationship is obtained from the rigidity of the system and is composed essentially of the rigidity of the brake fist (dependent on material and geometry) and of the brake linings. However, this rigidity is not significant until the application point has been reached. Accordingly, the precondition for the implementation of this exemplary embodiment of the invention is reliable detection of the application point, which takes place while taking into account the hydraulic admission pressure, in a way which is analogous to the detection of the application point explained below in the section "release of the parking brake". By analogy with the method below, the calibration of the position can also be carried out, which serves to calibrate the relationship between the characteristic curves for the brake-application force and the piston travel.

During the determination of the travel which is to be carried out by the actuator for a specific, desired brake-application force, it is also necessary to take into account the fact that the rigidity of the actuator is subject to changes which arise, for example, from the state of the brake linings (wear, temperature, temperature of the brake disc). In order to take these changes into account, operations are performed with a "worst-case characteristic curve", which allows for the abovementioned changes owing to safety considerations. However, such a "worst-case" characteristic curve" leads to increased mechanical loading on the actuator. Alternatively, for the various application cases it is possible to determine different characteristic curves and store them in the control unit (e.g. disc temperature model with rapid change, model for wear or number of brake activations with slow change and occasional measurement). Depending on the respective change, the respectively valid characteristic curve can then be selected and used in the determination of the travel to be carried out by the actuator.

Basically, the brake-application concepts of "limitation of the maximum current value" and "limitation of the brake-application travel" can also be combined. For example, a concept can be selected as a master concept and checked with the respective other concept. It is therefore appropriate, after application of the brake according to the "limitation of the maximum current value" to check whether the travel executed within the scope of the concept of "limitation of the brake-application travel" moves. If appropriate, a retightening function (see above) of the control unit can be activated.

It may also become necessary, as a result of failure of sensors, for the respective other brake-application concept to be applied. If, for example, the temperature sensor fails, the concept of "limitation of the brake-application travel" or the concept of "limitation of the maximum current value" can alternatively be used with a "worse-case temperature" until the sensor is repaired.

5. Release of the Parking Brake According to an Aspect of the Invention

In order to release the parking brake, a specific movement travel or release travel $\phi_{total\_release}$ is carried out in the release direction solely under the control of the actuator. Here, the setpoint movement travel is determined from the current distance from the application position (without admission pressure) $\phi_{clamp}$ and a brake-application clearance $\phi_{airgap\_set}$ which is to be predefined (the maximum brake-application clearance of the piston here is that which is defined by the position of the drive nut in the piston).

The following total travel is therefore carried out:

$$\phi_{total\_release} = \phi_{clamp} + \phi_{airgap\_set}, \phi_{airgap\_set} > 0\qquad\text{(Equation 11)}$$

In one exemplary embodiment, the control unit additionally has a so-called "disengage function/engage function". By means of the disengage function an extended brake-application clearance $\phi_{total\_release} + \phi_{ext}$ is predefined in addition to the brake-application clearance defined above, and is set by the travel controller. By means of the engage function, a return to the originally set brake-application clearance $\phi_{total\_release}$ is controlled by the control unit. By means of the engage/disengage functions it is possible, for example when heating of the brake can be detected without a braking request, to implement reliable venting of the parking brake. In this context, the control device has an emergency function which also provides application of the brake from the "disengage position" with extended brake-application clearance, so that the application point can be reliably detected.

The position of the brake shoes or the position of the actuator piston is generally not precisely known, for example when the above motor model (Equation 1) is used to determine the position, since the model contains simplifications and also the motor parameters are not known precisely. The errors which come about as a result of the inaccuracies and simplifications are integrated during the determination of the position and under unfavourable circumstances they quickly lead to deviations over multiple brake-application processes, which means that reliable setting of the brake-application clearance, which is based solely on adjustment of the position, is no longer ensured. For this reason, in one exemplary embodiment of the present invention, the position of the piston or of the brake shoes which is determined by the model is calibrated whenever the brake is applied. Calibration here means that the position value which is currently determined using a motor model is corrected.

For the calibration of the position, a brake caliper rigidity model is used which can be present in a form based on characteristic curves or parameters. Assuming that the brake-application force is quadrilaterally dependent on the travel carried out, in so far as the travel is greater than or equal to zero, and no force has to be applied if the travel is less than zero, and assuming also that only a force caused by the hydraulic admission pressure is present at the application point, the following parametric relationship can be derived and used for calibrating the position piston ($p_{piston}$ ... pressure at the piston):

$$x_{cp} = \sqrt{\frac{A_{eff} \cdot p_{piston}}{c}} \quad \text{(Equation 12)}$$

Accordingly, when the application point is known, it is possible to calibrate the position to the application point with the relationship specified in (Equation 12) by comparing the known application point with the calculated position value $x_{cp}$.

Figure 5:
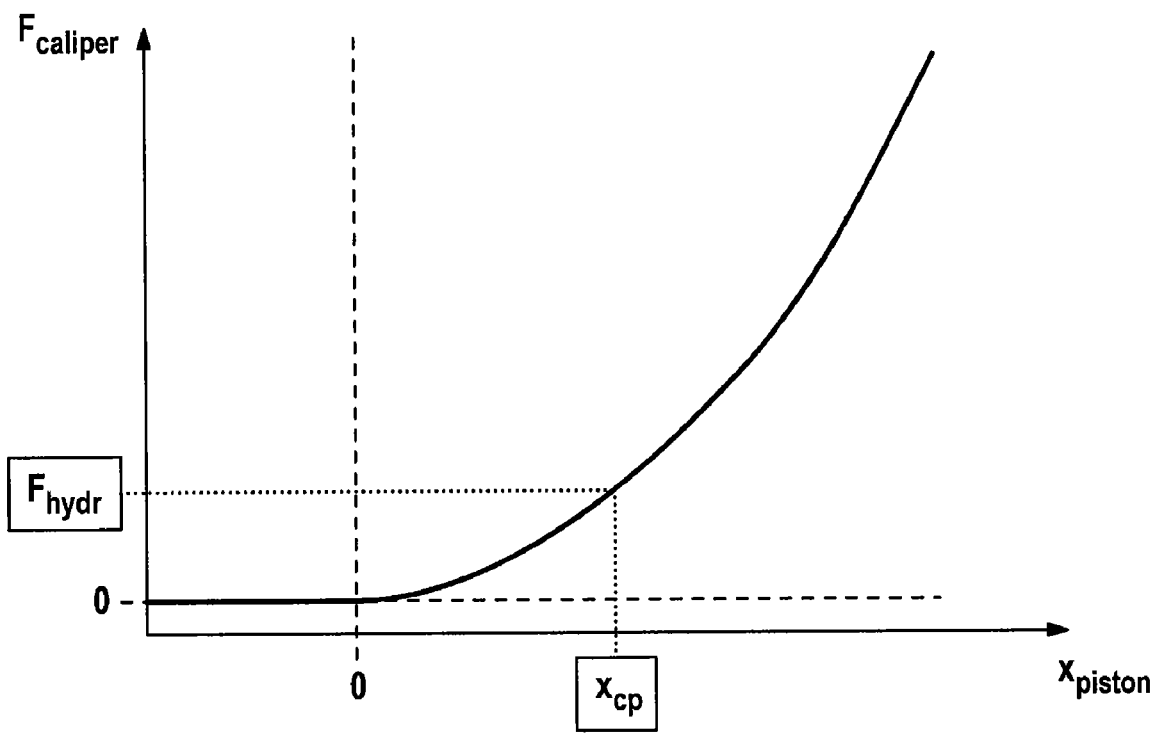
FIG. 5 shows a diagram illustrating the quadratic dependence of the brake-application force $F_{caliper}$ on the piston travel $x_{piston}$ for $F_{caliper} \geq 0$.

The relationship between the brake-application force and the travel carried out by the actuator is illustrated once more on the basis of the diagram illustrated in FIG. 5. The dotted line symbolizes the situation at the application point at which the travel $x_{cp}$ which is carried out corresponds to the hydraulic admission pressure $F_{hydr}$. The other positions of the characteristic curve can be correspondingly calibrated by means of this relationship.

Alternatively, it is possible to calibrate to the point of the travel which is carried out at which the maximum current value, i.e. the desired brake-application force, is set. This point is also accessible by means of the desired brake-application force via the motor model.

If the admission pressure is not available, it is nevertheless necessary to calibrate the position. In this case, in a further exemplary embodiment, a permanently predefined value can be used for the admission pressure (for example 40 bar). If appropriate, it is then necessary, when predefining the brake-application clearance travel $\phi_{airgap\_set}$, to set a somewhat larger value, so that grinding of the brake does not occur then even if the actual admission pressure was significantly higher than the assumed value.

In a further exemplary embodiment, the admission pressure which is used can be selected as a function of a possibly present slope inclination. Alternatively, the admission pressure value which is used can be determined as a function of the caliper characteristic curve. In the case of a characteristic curve which has a quadratic profile, it is possible, for example, to use the admission pressure which corresponds to half the movement travel. In the case of a maximum pressure of 200 bar, an admission pressure of approximately 50 bar could therefore be used, for example.

A precondition for calibration of the position is knowledge of the actual application point which moves in the course of the operation of the parking brake and which cannot be measured directly with the parking brake according to aspects of the invention without measuring force.

Through theoretical considerations on the basis of the realization that, at the application point, the derivative of the brake-application force with respect to the brake-application travel becomes greater than zero as a criterion for the determination of the application point, the following relationship is obtained:

$$\frac{di}{dt} > 0$$

A robust technical implementation in order to detect the application point in accordance with the relationship above takes into account the following, disruptive peripheral conditions:
- signals which are subject to noise (current i and voltage u)
- temperature dependence of all the variables ($R_{mot}$, $k_t$, $M_{R0}$)
- superimposed dynamic effects (start-up behaviour)
- qualitatively changed brake-application behaviour owing to wear
- system influences (for example due to switching on or off of the "adjacent actuator").

For the technical implementation of the detection of the application point, the voltage and current are measured cyclically with the sampling time $T_0$ (see motor model (Equation 1)). The values which are acquired are subsequently differentiated over time. Quadratic approximation has proven a robust method for this, with the application over a third-order approximation filter in which just three measured values are used for the formation of a parabola proving particularly advantageous.

Figure 6:
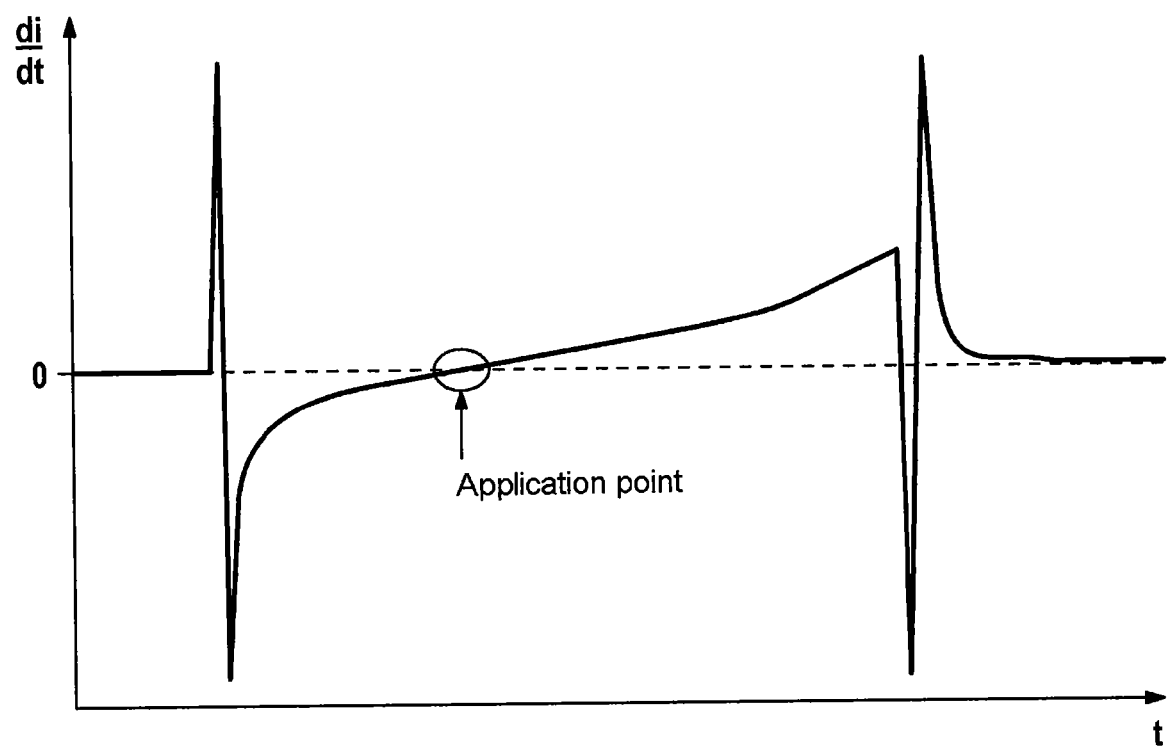
FIG. 6 shows a diagram showing the profile of the derivative of the motor current i over time t (di/dt) as a function of the time t during the application of the brake.

The derivative of the current over time is illustrated in the diagram in FIG. 6. In this illustration it becomes clear that the application point is characterized by a zero crossover of the derivative of the current over time. When the brake-application clearance is larger, it is, however, also possible for there to be an extended phase of the first derivative of the current, in which phase the derivative is in the vicinity of zero. In order to obtain clear delimitation from the starting-up behaviour, the detection of the application point by the observation of di/dt is not performed until a negative derivative occurs.

The method presented below was developed for the reliable and robust detection of the application point. At first, a (positive) limit $i_{p0}$ (derivative threshold value) is defined for the variable (di/dt) under consideration. This limit is a small (compared with the other values di/dt) positive value close to zero. If this limit is exceeded by di/dt, the current position is stored as a potential application point and a counter is started. At every new measured value, the counter continues to count in the upward direction, i.e. the counter is incremented by an incrementation value, until the variable under consideration becomes greater than the limit $i_{p0}$. If the variable drops below the limit, the counter is reset to zero. The potential application point is considered precisely at that time to be the actual application point if the counter reaches a predefined value $n_{predef}$ (counter threshold value). This ensures that the position after which the variable which is to be considered was greater than the predefined limit for at least $n_{predef}$ times is selected as the application point. This method has proven valuable in practice and supplies appropriate values even in the case of unusual current profiles.

The application point which is found is not checked for plausibility since the position can, of course, be calibrated precisely to the application point which is found, and therefore there is no (appropriate) variable available for comparison.

If a hydraulic admission pressure is present, an analogous method is used. However, depending on the real rigidity of the caliper, it may be necessary to reduce the limiting value $n_{predef}$ because in the case of high admission pressures the movement has already ended before the expiry of the $n_{predef}$ measured values which were considered at zero admission pressure. The following dependence of $n_{predef}$ on the admission pressure $p_0$ is therefore proposed:

$$n_{predef}(p_0) = 10 - trunc\left(\frac{p_0}{40 \text{ bar}}\right)$$

The algorithm described above for detecting the application point is also suitable for determining further calibration points. This is done by making a different selection for the limit $i_{p0}$ for a further calibration point. It is possible to attempt in this way to measure a relatively stable, i.e. linear, part of the caliper characteristic curve for the plausibility checking of the brake-application force which is set over the movement travel which is determined. In this context, the limit $i_{p0}$ for determining the calibration point is increased. If appropriate, another (smaller) $n_{predef}$ must be set for the determination of the calibration point which is found in the case of a relatively great force.

The brake-application clearance is determined by virtue of the fact that the brake-application clearance which has been set before the current brake-application process is determined by calculating the travel difference between the start of the brake-application process up to the time when the new application point is found. After the application of the brake, measurements for the previously set brake-application clearance are therefore present. If the measured brake-application clearance is smaller than the brake-application clearance which should be set, an incorrect setting may have occurred here. In order to prevent the same error, that is to say the setting of an excessively small brake-application clearance when the brake is next released, the setpoint value for the brake-application clearance is increased by a fixed absolute value for the next release process. If, in contrast, the measured brake-application clearance is significantly larger than the predefined value, the setpoint value for the next release of the brake can be decreased. Owing to safety considerations it is appropriate to increase the brake-application clearance in large increments and to decrease it again in significantly smaller increments.

After a hard reset of the control unit in which the control unit has not been powered down in an orderly fashion, the status of the actuator is unknown. In particular, there is no calibrated position available to which the actuation could refer. For this reason, before the normal operation of the parking brake an initiation operation of the actuator is necessary. The initiation operation starts when the operator control element of the parking brake is activated. When the brake is applied, the initiation is performed in such a way that the normal maximum current value is achieved during the application of the brake. However, during this application of the brake no detection of the application point is carried out. Then, the position of the actuator is set once to the standard value of the standard characteristic curve, i.e. up to the next time the application point is determined. It is assumed here that the setpoint brake-application force has just been set with the switch-off criterion. A value of the position which ensures reliable setting of the brake-application clearance when the brake is next opened/released is therefore present.

If the driver of the motor vehicle wishes to release the parking brake after a hard reset of the control unit, the initiation operation nevertheless firstly starts in the direction of application of the brake until the normal maximum current value is reached. The subsequent initiation procedure takes place in an analogous way to the above procedure. The parking brake is then released and a brake-application clearance is reliably set.

As a result of different wear, due to model errors or actuator-specific conditions, a significant asynchronicity, i.e. one which can be perceived by the driver of the motor vehicle, may occur between two actuators which are arranged in a motor vehicle. This takes place, for example, when the brake-application clearances to the left and right are given very different settings, and when the brake is next applied one actuator reaches its application point significantly earlier than the other. The time difference between the setting of the two application points is a measure of the asynchronicity of the actuators. If this time difference becomes longer than a permissible limit, in a further exemplary embodiment, the synchronous behaviour is restored by correspondingly changing the setpoint value of the brake-application clearance. For safety reasons, the setpoint value of the brake-application clearance of the apparently "faster" actuator is increased. This adaptation is preferably carried out in small increments (per activation) in order to compensate for the variance of the detection of the application point. Furthermore, the correction of the setpoint values of the brake-application clearance of the two actuators is advantageously integrated individually in order, when synchronism has been achieved, to reduce the correction on both sides simultaneously until the smaller brake-application clearance corresponds to the standard brake-application clearance.

The invention claimed is:

1. A method for operating a parking brake having an actuator, wherein the actuator is driven by a direct current motor which can be operated in two directions and which moves, via a self-locking gear mechanism of the actuator, at least one brake shoe for applying or releasing the parking brake in the direction of a rotary element or away therefrom, wherein a control unit is provided for performing open-loop or closed-loop control of the movement of the direct current motor, wherein, when the parking brake is applied or released, an application point of the brake shoes against the rotary element is generally overshot, and wherein, in order to determine the application point, the control unit forms the first derivative over time of the electric current which is taken up by the direct current motor during the application of the brake.

2. The method according to claim 1, wherein the control unit determines the application point as the positioning point of the brake shoe at which the derivative over time of the electric current which is taken up by the direct current motor becomes greater than zero.

3. The method according to claim 1, further comprising the steps:
defining a positive derivative threshold value ($i_{p0}$) for the first derivative (di/dt),
checking a brake-application movement of the direct current motor at predefined, intervals in order to determine whether the first derivative of the current (di/dt) taken up by the direct current is greater than or equal to the derivative threshold value ($i_{p0}$),
noting of the current brake shoe position as a potential application point and starting of a counter as well as incrementing of the counter by a previously defined incrementation value during the further brake-application movement of the direct current motor as long as the first derivative (di/dt) is greater than or equal to the derivative threshold value ($i_{p0}$), or resetting of the counter to zero as soon as the first derivative (di/dt) drops below the derivative threshold value ($i_{p0}$) again during the further brake-application movement of the direct current motor, if the first derivative is greater than or equal to the derivative threshold value ($i_{p0}$),
checking whether the counter exceeds a predefined counter threshold value ($n_{predef}$), and
noting the potential application point as the actual application point if the counter exceeds the predefined counter threshold value ($n_{predef}$).

4. The method according to claim 1, wherein, in order to perform open-loop or closed-loop control of the movement of the direct current motor in order to apply the parking brake with a desired, predefined brake-application force, the control unit determines a maximum current value which is to be taken up for said force by the direct current motor, the application of the brake is carried out by a corresponding movement of the direct current motor, and the movement of the direct current motor is ended after the maximum current value has been reached.

5. A method for operating a parking brake having an actuator, wherein the actuator is driven by a direct current motor which can be operated in two directions and which moves, via a self-locking gear mechanism of the actuator, at least one brake shoe for applying or releasing the parking brake in the direction of a rotary element or away therefrom, wherein a control unit is provided for performing open-loop or closed-loop control of the movement of the direct current motor, wherein, when the parking brake is applied or released, an application point of the brake shoes against the rotary element is generally overshot, and wherein, in order to determine the application point, the control unit forms the first derivative over time of the electric current which is taken up by the direct current motor during the application of the brake,
wherein this value of the first derivative is not identified as the application point until the derivative of the current before then has been negative.

6. A method for operating a parking brake having an actuator, wherein the actuator is driven by a direct current motor which can be operated in two directions and which moves, via a self-locking gear mechanism of the actuator, at least one brake shoe for applying or releasing the parking brake in the direction of a rotary element or away therefrom, wherein a control unit is provided for performing open-loop or closed-loop control of the movement of the direct current motor, wherein, when the parking brake is applied or released, an application point of the brake shoes against the rotary element is generally overshot, and wherein, in order to determine the application point, the control unit forms the first derivative over time of the electric current which is taken up by the direct current motor during the application of the brake, further comprising the steps:
defining a positive derivative threshold value ($i_{p0}$) for the first derivative (di/dt), checking a brake-application movement of the direct current motor at predefined, intervals in order to determine whether the first derivative of the current (di/dt) taken up by the direct current is greater than or equal to the derivative threshold value ($i_{p0}$),
noting of the current brake shoe position as a potential application point and starting of a counter as well as incrementing of the counter by a previously defined incrementation value during the further brake-application movement of the direct current motor as long as the first derivative (di/dt) is greater than or equal to the derivative threshold value ($i_{p0}$), or resetting of the counter to zero as soon as the first derivative (di/dt) drops below the derivative threshold value ($i_{p0}$) again during the further brake-application movement of the direct current motor, if the first derivative is greater than or equal to the derivative threshold value ($i_{p0}$),
checking whether the counter exceeds a predefined counter threshold value ($n_{predef}$), and
noting the potential application point as the actual application point if the counter exceeds the predefined counter threshold value ($n_{predef}$),
wherein the step of checking of the brake-application movement of the direct current motor is done at regular intervals.

7. A method for operating a parking brake having an actuator, wherein the actuator is driven by a direct current motor which can be operated in two directions and which moves, via a self-locking gear mechanism of the actuator, at least one brake shoe for applying or releasing the parking brake in the direction of a rotary element or away therefrom, wherein a control unit is provided for performing open-loop or closed-loop control of the movement of the direct current motor, wherein, when the parking brake is applied or released, an application point of the brake shoes against the rotary element is generally overshot, and wherein, in order to determine the application point, the control unit forms the first derivative over time of the electric current which is taken up by the direct current motor during the application of the brake,
wherein, during the open-loop or closed-loop control of the direct current motor for applying and/or releasing the parking brake, the control unit takes into account a hydraulic admission pressure which is currently present at a piston if the brake is applied or was present at the piston if the brake has been released when it had previously been applied.

8. A method for operating a parking brake having an actuator, wherein the actuator is driven by a direct current motor which can be operated in two directions and which moves, via a self-locking gear mechanism of the actuator, at least one brake shoe for applying or releasing the parking brake in the direction of a rotary element or away therefrom, wherein a control unit is provided for performing open-loop or closed-loop control of the movement of the direct current motor, wherein, when the parking brake is applied or released, an application point of the brake shoes against the rotary element is generally overshot, and wherein, in order to determine the application point, the control unit forms the first derivative over time of the electric current which is taken up by the direct current motor during the application of the brake,
wherein, when the brake has been applied and/or released by a motor model, the control unit continuously determines an activation travel which has been carried out by the direct current motor.

9. The method according to claim 8, wherein the control unit determines a brake-application travel which has been carried out from the activation travel between the determined application point and the activation position when the predefined maximum current value is reached, and the brake-application travel which has been carried out is subsequently compared with a standard brake-application travel corresponding to the desired brake-application force, wherein, when there is a significant deviation of the brake-application travel which has been carried out from the standard brake-application travel, a retightening function of the control unit is activated.

10. The method according to claim 9, wherein the retightening function includes a travel adjustment.

11. The method of claim 10 wherein the retightening of the brake is carried out directly after the brake-application process has ended.

12. The method of claim 11 wherein the retightening of the brake is carried out directly after the brake-application process has ended.

13. The method according to claim 9, wherein the control unit uses a knock function for the retightening of the brake.

14. The parking brake according to claim 13, wherein this value of the first derivative is not identified as the application point until the derivative of the current before then has been negative.

15. A method for operating a parking brake having an actuator, wherein the actuator is driven by a direct current motor which can be operated in two directions and which moves, via a self-locking gear mechanism of the actuator, at least one brake shoe for applying or releasing the parking brake in the direction of a rotary element or away therefrom, wherein a control unit is provided for performing open-loop or closed-loop control of the movement of the direct current motor, wherein, when the parking brake is applied or released, an application point of the brake shoes against the rotary element is generally overshot, and wherein, in order to determine the application point, the control unit forms the first derivative over time of the electric current which is taken up by the direct current motor during the application of the brake,
wherein the control unit calibrates a piston position, determined by a motor model, while taking into account a hydraulic admission pressure acting at the determined application point or the determined position when a predefined maximum current value is reached.

16. A method for operating a parking brake having an actuator wherein the actuator is driven by a direct current motor which can be operated in two directions and which moves, via a self-locking gear mechanism of the actuator, at least one brake shoe for applying or releasing the parking brake in the direction of a rotary element or away therefrom, wherein a control unit is provided for performing open-loop or closed-loop control of the movement of the direct current motor, wherein, when the parking brake is applied or released, an application point of the brake shoes against the rotary element is generally overshot, and wherein, in order to determine the application point, the control unit forms the first derivative over time of the electric current which is taken up by the direct current motor during the application of the brake,
wherein, in order to release the parking brake, the control unit controls the movement of a nut in the release direction, wherein the application point which was determined during the last application of the brake, while taking into account a hydraulic admission pressure, and a predefined brake-application clearance are taken into account in the calculation of a setpoint movement travel used for the control of the movement of the nut.

17. A parking brake having an actuator, wherein the actuator is driven by a direct current motor which can be operated in two directions and which moves, via a self-locking gear mechanism of the actuator, at least one brake jaw for applying or releasing the parking brake in the direction of a rotary element or away therefrom, wherein a control unit is provided for performing open-loop or closed-loop control of the movement of the direct current motor, wherein the parking brake is embodied in such a way that, when the parking brake is applied or released, an application point of the brake shoes against the rotary element is generally overshot, wherein the control unit determines the application point by forming the first derivative over time of the electric current which is taken up by the direct current motor during the application of the brake.

18. The parking brake according to claim 17, wherein the control unit determines the application point as the positioning point of a brake shoe at which the derivative over time of the electric current which is taken up by the direct current motor becomes greater than zero.

19. The parking park according to claim 17, wherein, in order to perform open-loop or closed-loop control of the movement of the direct current motor in order to apply the parking brake with a desired, predefined brake-application force, the control unit determines a maximum current value which is to be taken up by the direct current motor for this purpose, carries out the application of the brake by means of a corresponding movement of the direct current motor, and ends the movement of the direct current motor after the maximum current value has been reached.

20. The parking brake according to claim 17, wherein, in order to release the parking brake, the control unit controls the movement of a nut in the release direction, wherein the control unit takes into account the application point, which was determined during the last application of the brake, while taking into account a hydraulic admission pressure, and a predefined brake-application clearance in the calculation of the setpoint movement travel which is used for the control of the movement of the nut.

21. A parking brake having an actuator, wherein the actuator is driven by a direct current motor which can be operated in two directions and which moves, via a self-locking gear mechanism of the actuator, at least one brake jaw for applying or releasing the parking brake in the direction of a rotary element or away therefrom, wherein a control unit is provided for performing open-loop or closed-loop control of the movement of the direct current motor, wherein the parking brake is embodied in such a way that, when the parking brake is applied or released, an application point of the brake shoes against the rotary element is generally overshot, wherein the control unit determines the application point by forming the first derivative over time of the electric current which is taken up by the direct current motor during the application of the brake,
wherein, during the open-loop or closed-loop control of the direct current motor in order to apply and/or release the parking brake, the control unit takes into account a hydraulic admission pressure which is currently present at a piston if the brake is applied or was present at the piston if the brake has been released when it had previously been applied.

22. A parking brake having an actuator, wherein the actuator is driven by a direct current motor which can be operated in two directions and which moves, via a self-locking gear mechanism of the actuator, at least one brake jaw for applying or releasing the parking brake in the direction of a rotary element or away therefrom, wherein a control unit is provided for performing open-loop or closed-loop control of the movement of the direct current motor, wherein the parking brake is embodied in such a way that, when the parking brake is applied or released, an application point of the brake shoes against the rotary element is generally overshot, wherein the control unit determines the application point by forming the first derivative over time of the electric current which is taken up by the direct current motor during the application of the brake, > wherein, when the brake is applied and/or released by means of a motor model, the control unit continuously determines an activation travel which has been carried out by the direct current motor.

23. A parking brake having an actuator, wherein the actuator is driven by a direct current motor which can be operated in two directions and which moves, via a self-locking gear mechanism of the actuator, at least one brake jaw for applying or releasing the parking brake in the direction of a rotary element or away therefrom, wherein a control unit is provided for performing open-loop or closed-loop control of the movement of the direct current motor, wherein the parking brake is embodied in such a way that, when the parking brake is applied or released, an application point of the brake shoes against the rotary element is generally overshot, wherein the control unit determines the application point by forming the first derivative over time of the electric current which is taken up by the direct current motor during the application of the brake, > wherein the control unit calibrates a piston position, determined by a motor model, while taking into account a hydraulic admission pressure acting at the determined application point or the determined position when a predefined maximum current value is reached.

24. A parking brake having an actuator, wherein the actuator is driven by a direct current motor which can be operated in two directions and which moves, via a self-locking gear mechanism of the actuator, at least one brake jaw for applying or releasing the parking brake in the direction of a rotary element or away therefrom, wherein a control unit is provided for performing open-loop or closed-loop control of the movement of the direct current motor, wherein the parking brake is embodied in such a way that, when the parking brake is applied or released, an application point of the brake shoes against the rotary element is generally overshot, wherein the control unit determines the application point by forming the first derivative over time of the electric current which is taken up by the direct current motor during the application of the brake, > wherein the control unit determines a brake-application travel which has been carried out from the activation travel between the determined application point and an activation position when a predefined maximum current value is reached, and the brake-application travel which has been carried out is subsequently compared with a standard brake-application travel corresponding to the desired brake-application force, wherein, when there is a significant deviation of the brake-application travel which has been carried out from the standard brake-application travel, a retightening function of the control unit can be activated.

25. The parking brake according to claim 24, wherein the retightening function includes a travel adjustment.

26. The parking brake according to claim 25, wherein the control unit retightens the brake directly after the brake-application process has ended.

27. The parking brake according to claim 26, wherein the control unit retightens the brake directly after the brake-application process has ended.

28. The parking brake according to claim 24, wherein the control unit uses a knock function for the retightening of the brake.

\* \* \* \* \*